United States Patent [19]

Nakagawa et al.

[11] Patent Number: 5,637,836
[45] Date of Patent: Jun. 10, 1997

[54] CONSTANT-RATE FEEDER OF POWDERY MATERIAL AND METHOD FOR PRODUCING COMPRESSED POWDERY PRODUCT

[75] Inventors: Mitsuhiko Nakagawa; Hatsuo Murakami; Keisuke Fujiki; Toshikazu Kogetsu, all of Itami, Japan

[73] Assignee: Sumitomo Electric Industries, Ltd., Osaka, Japan

[21] Appl. No.: 211,170

[22] PCT Filed: Jul. 19, 1993

[86] PCT No.: PCT/JP93/01003

§ 371 Date: Mar. 18, 1994

§ 102(e) Date: Mar. 18, 1994

[30] Foreign Application Priority Data

Jul. 20, 1992 [JP] Japan .................... 4-192187
Nov. 4, 1992 [JP] Japan .................... 4-294864
Jul. 9, 1993 [JP] Japan .................... 5-170345

[51] Int. Cl.$^6$ .................................. G01G 13/18
[52] U.S. Cl. ............... 177/105; 177/116; 177/119; 222/236; 425/256; 264/40.4; 366/151.1; 198/525
[58] Field of Search ...................... 222/236, 238, 222/410; 366/151.1, 153.1, 154.1, 155.1, 155.2; 177/105, 108, 109, 116, 119, 120, 121, 123, 60, 64, 59, 98, 99, 100; 198/525, 534; 425/256, 447; 264/40.4, 109, 115, 116, 122

[56] References Cited

U.S. PATENT DOCUMENTS

| | | | |
|---|---|---|---|
| 2,098,246 | 11/1937 | Jarrier | 198/525 |
| 2,579,527 | 12/1951 | Weyerhaeuser | 198/525 |
| 2,879,904 | 3/1959 | Walsh et al. | 198/525 |
| 3,088,576 | 5/1963 | Mumma | 198/525 |
| 3,487,911 | 1/1970 | Wirz | 198/525 |
| 3,604,599 | 9/1971 | Richmond | 222/236 |
| 4,436,226 | 3/1984 | Aggen | 222/280 |
| 4,557,882 | 12/1985 | Arnold | 264/40.4 |
| 5,031,546 | 7/1991 | Amos et al. | 222/238 |
| 5,092,490 | 3/1992 | Suzuki et al. | 222/56 |

*Primary Examiner*—Michael L. Gellner
*Assistant Examiner*—Randy W. Gibson
*Attorney, Agent, or Firm*—Wenderoth, Lind & Ponack

[57] ABSTRACT

A constant-rate feeding device can weigh out, with high accuracy and at a high rate, a powdery material containing fibrous substances and thus having a high entangling tendency, such as a material for a friction member. A powdery material A supplied from a belt feeder (17) is divided into a plurality of masses by a first vane wheel (3) and dropped onto a damper provided under the vane wheel. The powdery material deposited on the damper is divided into small masses and discharged by moving vanes (5a) of a second vane wheel (5) through openings (4a) of the damper. Thus, the material can be fed and weighed out with high accuracy. The damper (4) is moved out of the feed path of the material except during the final stage of weighing operation for increased weighing speed. The damper (4) may comprise a plurality of movable comb teeth. By moving or turning the comb teeth relative to one another, it is possible to adjust the area of the opening of the damper and thus the feed rate of the material with high accuracy.

16 Claims, 13 Drawing Sheets

$W_1 > W$

CONSTANT-RATE FEEDER OF POWDERY MATERIAL AND METHOD FOR PRODUCING COMPRESSED POWDERY PRODUCT

BACKGROUND OF THE INVENTION

1. Technical Field

This invention relates to a constant-rate powder feeder for feeding a powdery material containing such substances as inorganic fibers such as steel fiber, organic fiber and pulp, which tend to get entangled with one another, to a weighing unit at a controlled feed rate for high weighing speed and accuracy. This invention also concerns an apparatus capable of mass-producing high-quality friction members (such as disk pads and drum linings) and other similar members by compacting a mixture of fiber-reinforced metal comprising ceramic fiber and metallic powder, organic, inorganic and metallic fibers, binder resins, fillers and solid lubricants, and also relates to a method for manufacturing such members formed by compacting powder.

2. Background Art

A screw feeder is used when it is desired to feed a powdery material from a hopper to a weighing unit and to take it out therefrom at a controlled rate. Some of such screw feeders have a variable-speed screw. By rotating the screw at a high speed, a powdery material can be fed at a high rate. While the revolving speed is low, the powdery material is fed at a low rate. The feed rate is adjusted by rotating the screw at a suitable speed. Other types have large and small screw feeders. A small one is used to adjust the feed rate at the final stage of a weighing cycle.

Also, there are known other types in which powdery material is fed to a weighing unit by means of a belt feeder or a rotary feeder.

FIG. 19 illustrates a conventional method of manufacturing friction members in which a powdery material is fed into a mold using a screw feeder type weighing machine. As shown in the figure, the powdery material (a mixture of raw materials) in a hopper 30 is fed by a screw 31, divided into small portions with a vane wheel 32, and dropped into a weighing can 33. When the amount of material in the can reaches a predetermined level, the feed of material is stopped and the material in the can is emptied into the cavity of a mold 34. The material emptied into the cavity tends to heap up like a mound as shown in the figure. When the material is compacted in this state, its density tends to be extremely higher at its center than the remaining part.

Thus, it has been necessary to stir the material with a knife 35 to flatten the mound before compacting it with a press.

These conventional devices also have a problem in that the weighing speed and accuracy are low if the powdery material to be weighed contains fibers or other substances that tend to get entangled with each other. The weighing accuracy tends to be low because a material containing easy-to-entangle substances tends to drop into the weighing unit in masses which vary in sizes. Some of such masses may be very large. The weighing accuracy also varies with the feed speed. Thus, the weighing speed has to be low.

If the powdery material has a large angle of repose, an oscillator is often used to break the material into small portions. But if the material contains fibers or particles having different specific gravities, the use of an oscillator is objectionable because, by oscillating the material, the uniformity in mixture tends to be lost, if it is important that the components be mixed uniformly.

Moreover, if a mixture of fiber and particles having widely different specific gravities or particle diameters is oscillated, agitated, dropped or slid along a wall surface, the material may suffer separation, segregation or splashing, so that the uniformity in mixture will be lost. Thus, it is not desirable to stir the material with a knife.

Further, an easy-to-entangle material containing fibers is likely to suffer a marked change in density due to its own weight or if subjected to compression force, even though its outer appearance remains unchanged. Thus, it is difficult to fill the cavity with the material uniformly by flattening it with a knife.

SUMMARY OF THE INVENTION

Object of the Invention

It is an object of the present invention to feed a material having a high entangling tendency in small masses without impairing high uniformity in mixture and to feed the material at a controlled rate, thereby improving the weighing accuracy and speed.

A second object is to provide a method of producing a compacted product of powdery material such as a friction member which is high in homogeneity and uniformity of density by feeding a predetermined weight of material into a mold while reducing the possibility of separation, segregation and splashing of the material to a minimum and pressing the material in the mold.

DISCLOSURE OF THE INVENTION

In order to attain the above objects, according to this invention, there is provided a constant-rate feeding device comprising a feeder for feeding a powdery material toward a weighing unit located under the outlet of the feeder, a damper for receiving from the feeder the powdery material divided into a plurality of masses, means for discharging the material deposited on the damper after dividing it into a plurality of masses in the width direction, and means for moving the damper out of the feed path of the powdery material and keeping the damper in this position until the amount of the material weighed out approaches a predetermined value.

By discharging the material supplied from the feeder after dividing it into a plurality of masses in the width direction, the flow rate per unit time can be reduced (amount of material fed from the feeder divided by the number of masses divided). The weighing accuracy thus improves.

In order to divide the material into a plurality of small masses, there are used a damper having comb-like teeth with openings defined therebetween and a plurality of members which discharge the material by cyclically passing through the openings. These members may be vanes or vertically reciprocable members.

Such a damper may comprise a plurality of divided members for receiving the material fed from the feeder, and means for changing the area of the openings between the divided members by changing the position or direction of part or all of the divided members. It is preferable to provide means for moving such a damper out of the feed path of the material.

These devices should preferably have a first vane wheel having vanes for dividing the material supplied from the feeder.

Also, both devices should preferably be provided with a shutter between the damper and the weighing unit located under the damper for receiving the material discharged through the openings of the damper.

In order to achieve the second object, according to this invention, there is provided a method of manufacturing a compacted powdery product comprising the steps of feeding a powdery material toward a weighing unit on a belt feeder while controlling the width of the material being fed on the belt feeder within a range of between ½ and 3/2 of the width of an end product, and feeding the width-controlled material delivered from the belt feeder to the weighing unit with the above-described feeding device, weighing out a predetermined amount of the powdery material in a weighing can, and press-molding the material in the weighing can or after emptying the material into a mold.

In this method, a hopper for supplying powdery material may be provided over the belt feeder, the hopper being provided at its bottom with a shutter having comb-like openings. By opening and closing the shutter, it is possible to uniformly control the thickness of the powdery material on the conveyor belt of the feeder.

The width of the material being fed on the belt feeder may be controlled by controlling the width of the outlet of the hopper with a control device or by adjusting the spacing between guide plates provided on the conveyor belt of the belt feeder and movable toward and away from each other.

If the material cut and supplied from the feeder has a high entangling tendency, most parts of it cannot pass through the openings in the damper due to bridging of the material, provided the openings have the right width. Most parts of the material thus deposited on the damper and its part near the edges of the openings are scraped off and dropped by the members that perodically pass through the openings, such as vanes of a vane wheel. Thus, the material can be fed little by little at a desired rate with high accuracy by controlling the revolving speed of the vane wheel.

If the opening area of the damper is larger than a predetermined value, the powdery material on the damper will drop spontaneously, without the need to scrape it off with the vane wheel. In other words, it is possible to control the feed rate with high accuracy by controlling the opening area of the damper.

Also, the material may be discharged little by little after dividing it into a plurality of masses in the width direction. With this arrangement, it is possible to reduce the flow rate per unit time and thus to improve the weighing accuracy still further. For this purpose, a flat damper having no openings and a member for scraping off the material on the flat damper should be used.

By providing the first vane wheel, it is possible to drop the material from the feeder onto the damper with a predetermined cycle and thus to feed the material onto the damper at a controlled rate.

By providing the shutter under the damper, it is possible to prevent an excessive amount of material from dropping by closing the shutter at or just before the end of the weighing operation. This further improves the material feeding and weighing accuracy.

The secondary feed rate control is carried out only at the final stage of the weighing operation by means of the damper and vane wheel or by adjusting the size of the damper opening. Thus, it is possible to increase the feed rate of the material while maintaining high weighing accuracy.

In the method of the present invention, the width and, if necessary, the thickness of the material being fed on the belt feeder is controlled, so that the material is less likely to heap up like a mound when fed into the weighing can in the weighing unit. Thus, it is scarcely, or not at all, necessary to stir the material in the can with a knife to flatten it out. Since the material is not stirred, it is less likely to separate, segregate or splash. The end products will thus be high in homogeneity and uniform in density distribution.

If the width of the material is controlled while being fed, the damper should be dimensioned such that it can cope with the maximum width of the material.

In the embodiment in which the damper having openings is used in combination with the vane wheel having vanes that pass through the openings, the order of passage of the vanes through the openings is determined properly so that most part of the powdery material on the damper may not drop onto a limited part of the area onto which the material is supposed to drop, such as its center or one side. For example, by arranging the vanes of the vane wheel so that they pass through the openings of the damper in the order as shown in FIG. 14, it is at least possible to prevent the material from dropping only onto a limited small area.

The same purpose is attainable by controlling the opening area of the damper, too.

If the material being fed on the belt feeder has a uniform thickness and has the same width as the end products, it is possible to eliminate any difference in filling amount in the width direction if the weighing can has the same shape as the end products. (The weighing can may be a mold so that the material can be press-molded in the weighing can without moving the material into a separate mold.)

If the end products are wide at their center and narrow at both ends, the width of the material being fed on the conveyor belt should be controlled so as to be slightly narrower than the width of the end products. By controlling the width of the material according to the shape of the end products, it is possible to produce end products having a uniform density. But if the width of the material being fed on the conveyor belt is out of the range between ½ and ⅔ of the width of the end products, the density of the end products may not be uniform.

DETAILED DESCRIPTION OF THE PREFERRED EMBODIMENTS

Figure 1:
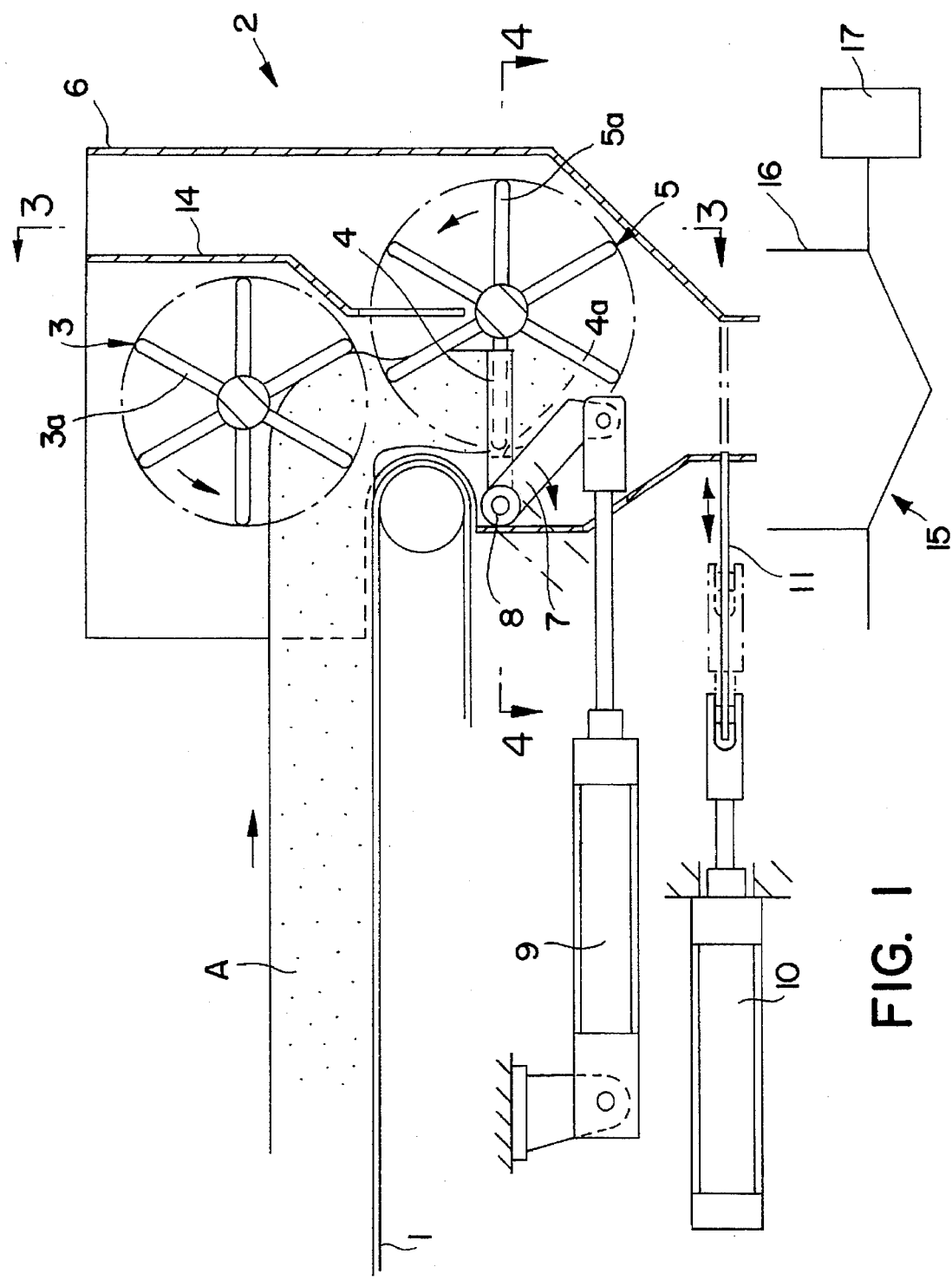
FIG. 1 is a partially cutaway side view of a first embodiment of the present invention.

FIGS. 1–4 show an embodiment of a constant-rate feeder of this invention.

Numeral 1 indicates a belt feeder for feeding a powdery material A supplied from a hopper (not shown) toward a weighing unit 15. At the outlet end of the feeder 1 is provided a constant feeder 2.

The constant feeder 2 comprises a first vane wheel 3 provided across the belt feeder 1 at its outlet end for primary control of the feed rate of the material A, a damper 4 having comb-shaped openings 4a and provided right under the vane wheel 3, a second vane wheel 5 for secondary control of the feed rate of the material in cooperation with the damper 4, a funnel-shaped guide pipe 6 surrounding these members for preventing powdery material from splashing, and a cylinder 9 for pivoting the damper 4 about a shaft 8 through a link 7. By pulling and pushing a cylinder 10, an outlet opening of the guide pipe 6 is opened and closed by a shutter 11. The feeder 2 also has a motor 13 for rotating the second vane wheel 5 and further for rotating the first vane wheel 3 through a power transmission means 12 (a belt and a pulley in the embodiment).

Figure 5:
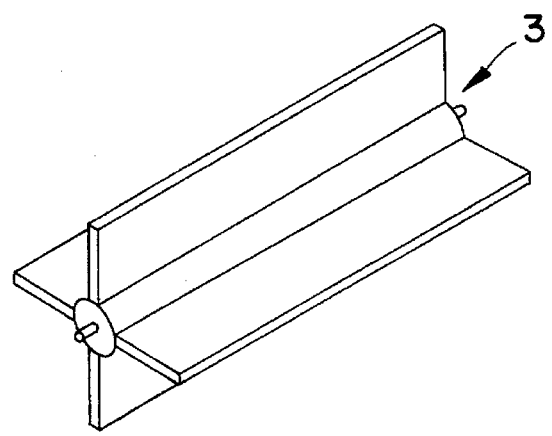
FIG. 5 is a perspective view of another example of a first vane wheel.

The first vane wheel 3 may comprise a shaft and three to four vanes mounted on the shaft as shown in FIG. 5. If used for a powdery material containing a large amount of fiber and thus having a high tendency to get entangled, it is preferable to use the vane wheel of this embodiment (FIGS. 1 and 2), which carries pin-like vanes 3a, because this vane wheel encounters less resistance when turned in the powder. The first vane wheel 3 should be driven at such a speed that its vanes will move slightly faster than the belt feeder 1 so that the entangled fibers in the powdery material A can be cut apart by the vanes.

Figure 6A:
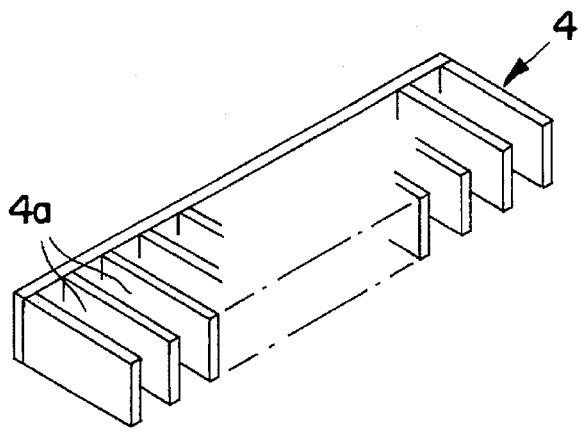
FIGS. 6(a and b) are perspective views showing several examples of a damper.
Figure 6B:
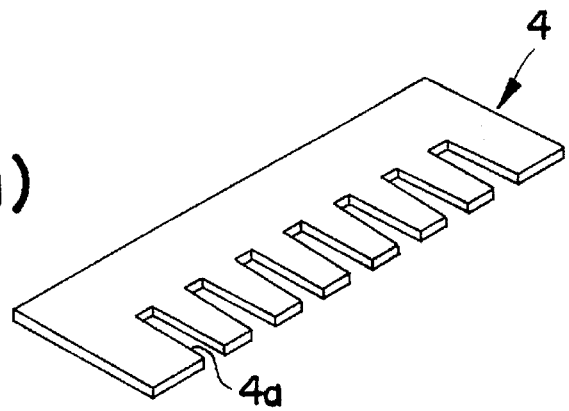

The damper 4 may comprise a base plate and a plurality of plates secured to the base plate at a predetermined pitch as shown in FIG. 6(a), or may be in the form of an integral plate having many slits like a comb, as shown in FIG. 6(b). It may be shaped and dimensioned in any desired way. It is preferable to use a damper having larger openings if the entangling tendency of the powdery material is high, and to use a damper having smaller openings if it is low.

The position and size of the openings 4a should be determined taking into account the entangling tendency and the position of the area onto which the powdery material drops. If the entangling tendency of the material is high, the openings 4a should preferably be large enough to cover the entire area onto which the powdered material drops and have a large width W as shown in FIG. 7.

Figure 7:
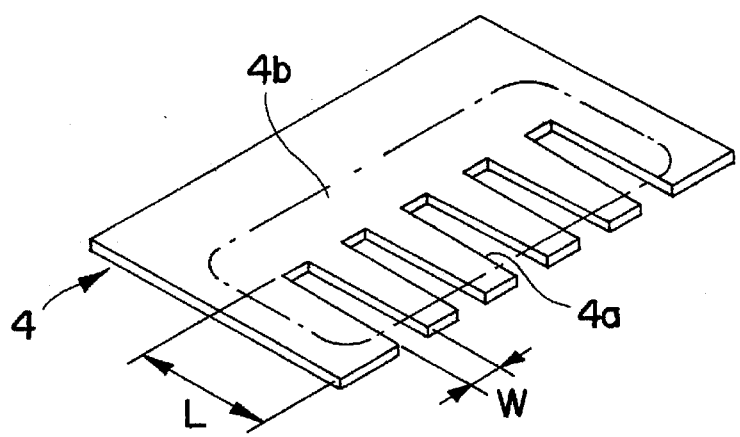
FIG. 7 is a view showing the positional relation between an area where the powdery material drops and openings of the damper.
Figure 8:
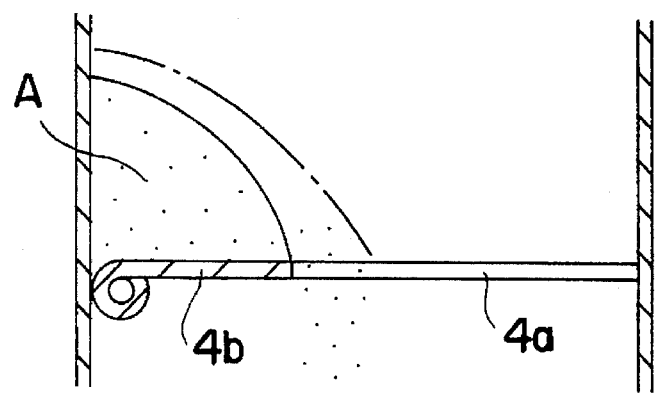
FIG. 8 is a view showing the function of a portion of the damper having no openings.

If the material has a lower entangling tendency, it is preferable that the openings have a large width W and a small depth L to provide a portion 4b where there are no openings within the area onto which the powdery material drop (the area defined by the chain line in FIG. 7). By providing the portion 4b, it is possible to reduce the flow rate per unit time. As shown in FIG. 8, part of the powdery material dropping onto the portion 4b heaps up like a mound with time. When the inclination of the mound exceeds a predetermined angle, the material will begin to flow into the openings 4a little by little. Thus, it is possible to delicately control the flow rate of the material.

The damper 4 is withdrawn out of the feed path of the powdery material at the beginning of the weighing operation and moved by the cylinder 9 to the position shown by solid lines in FIG. 1 for the secondary feed rate control when the weighed value approaches a predetermined value.

The feeder 1 is initially driven at high speed, and when the secondary control by the damper 4 begins, its driving speed is reduced. Thus, the weighing operation can be carried out not only with high accuracy, but quickly.

Figure 9:
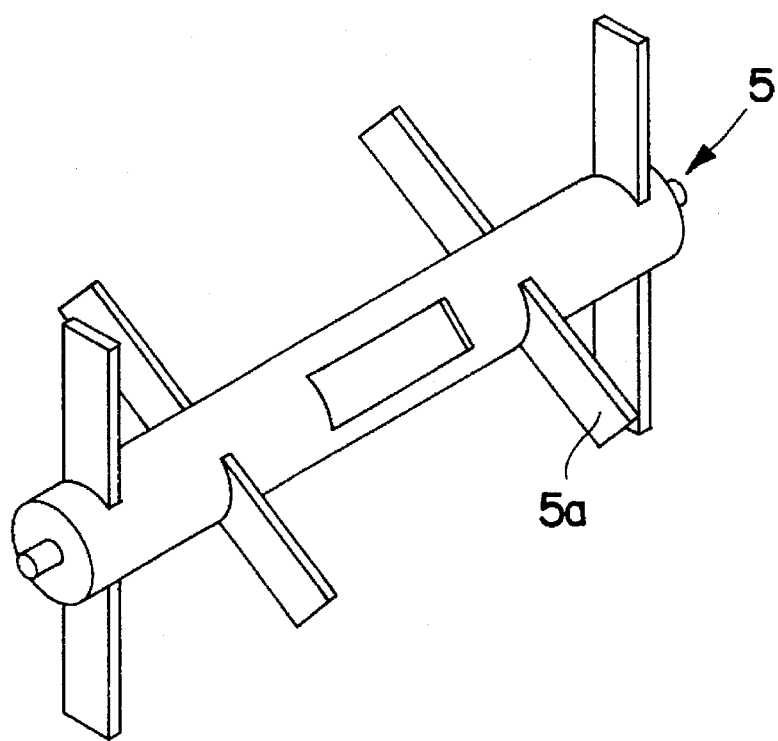
FIG. 9 is a perspective view of another example of a second vane wheel.

The vanes 5a of the second vane wheel 5 may be pins, as in the first embodiment, or may be plates as shown in FIG. 9. These vanes pass periodically through the openings of the damper 4, thereby forcibly scraping off the powdery material from the damper little by little. The second vane wheel 5 may be replaced with a mechanism which reciprocates up and down through the openings to scrape off the material.

The shutter 11 is opened when starting the weighing operation and closed when a predetermined amount has been weighed. According to the amount of material that drops through the damper per unit time, it may be preferable to close the shutter shortly before the predetermined amount is reached so that an excessive amount of material does not drop.

Figure 3:
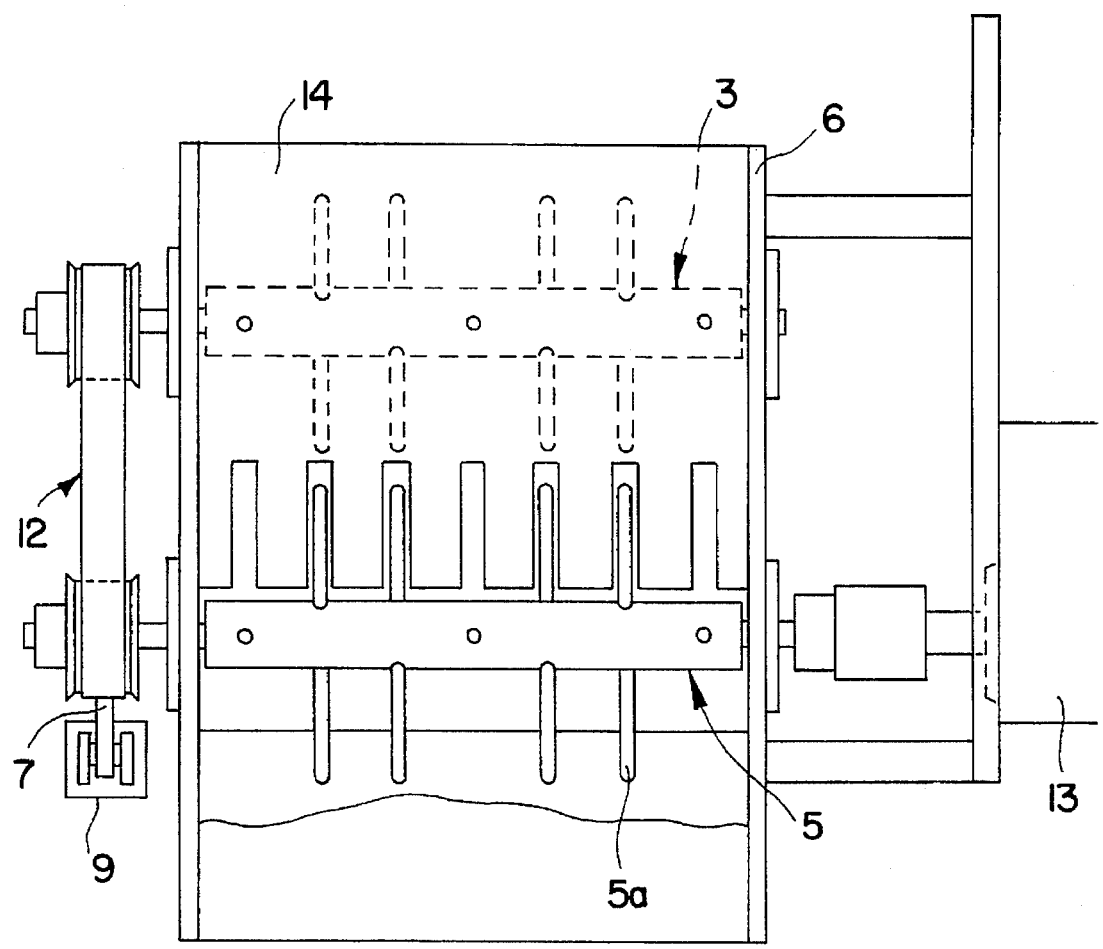
FIG. 3 is a sectional view taken along line 3—3 of FIG. 1.
Figure 4:
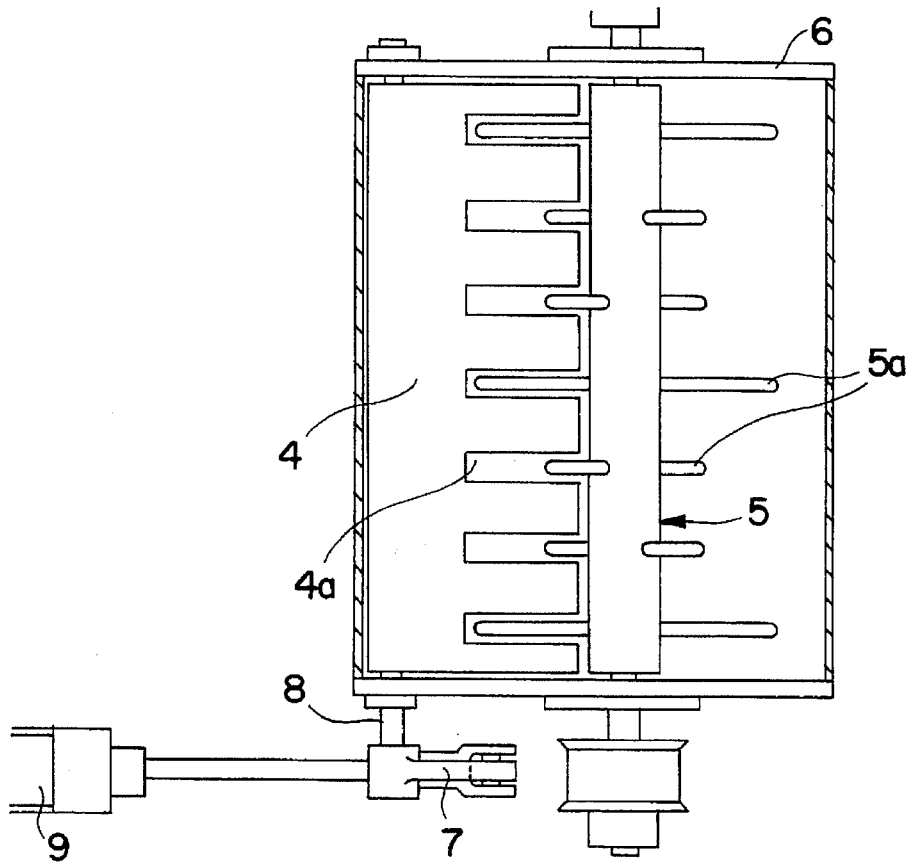
FIG. 4 is a sectional view taken along line 4—4 of FIG. 1.

Numeral 14 in FIGS. 1 and 3 indicates a partitioning plate provided in the guide pipe 6. It has slits through which the vanes 5a of the second vane wheel 5 can pass.

Numeral 16 in FIG. 1 is a weighing can. A weighing unit 15 has a measuring mechanism 17 for measuring the amount of the material in the weighing can 16.

This type of device may have two dampers of the above-described type (the upper one having larger openings than the lower one). In order to further improve the weighing accuracy, more than two dampers and vane wheels may be used.

Figure 10:
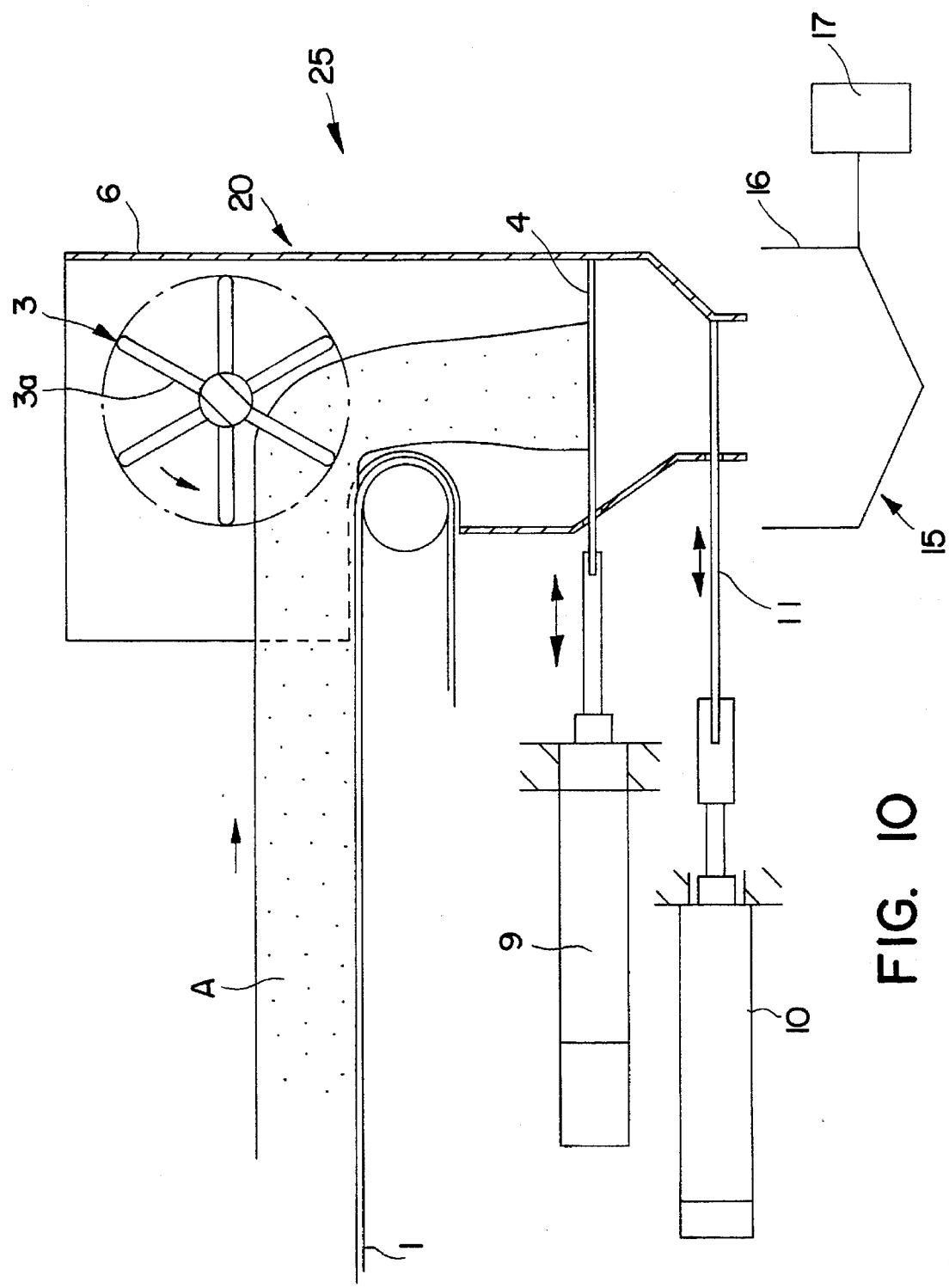
FIG. 10 is a partially cutaway side view showing another embodiment according to the present invention.
Figure 11:
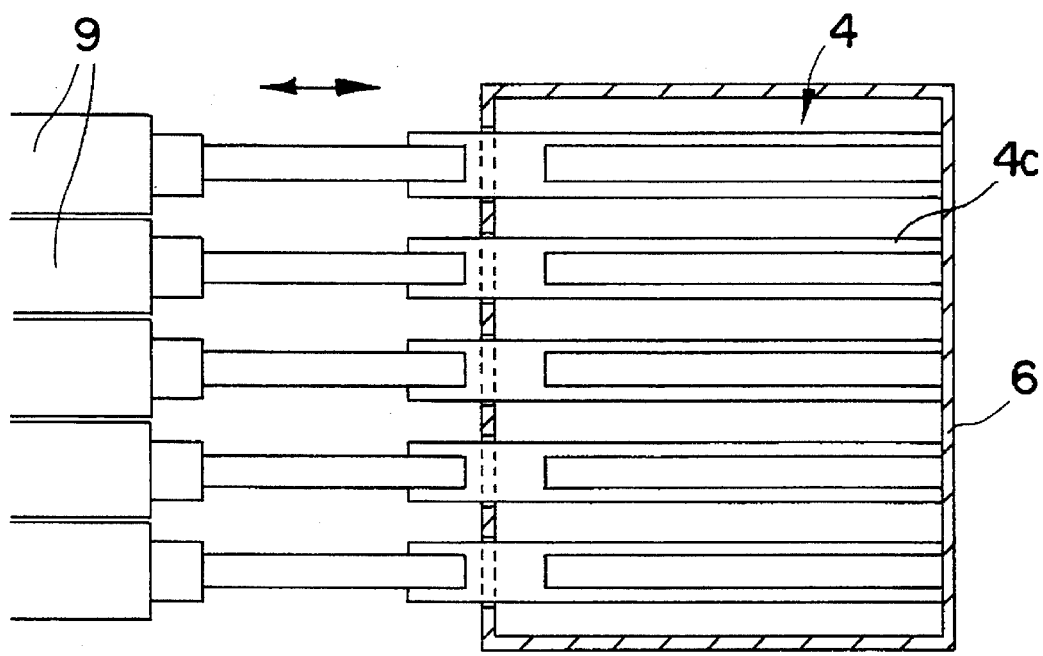
FIG. 11 is a plan view of a damper of the embodiment of FIG. 10.

Now referring to FIGS. 10 and 11, description will be made of a second embodiment of a constant-rate feeding device according to the present invention. Parts like those in the first embodiment are denoted with like numerals, and their description is omitted.

Figure 2:
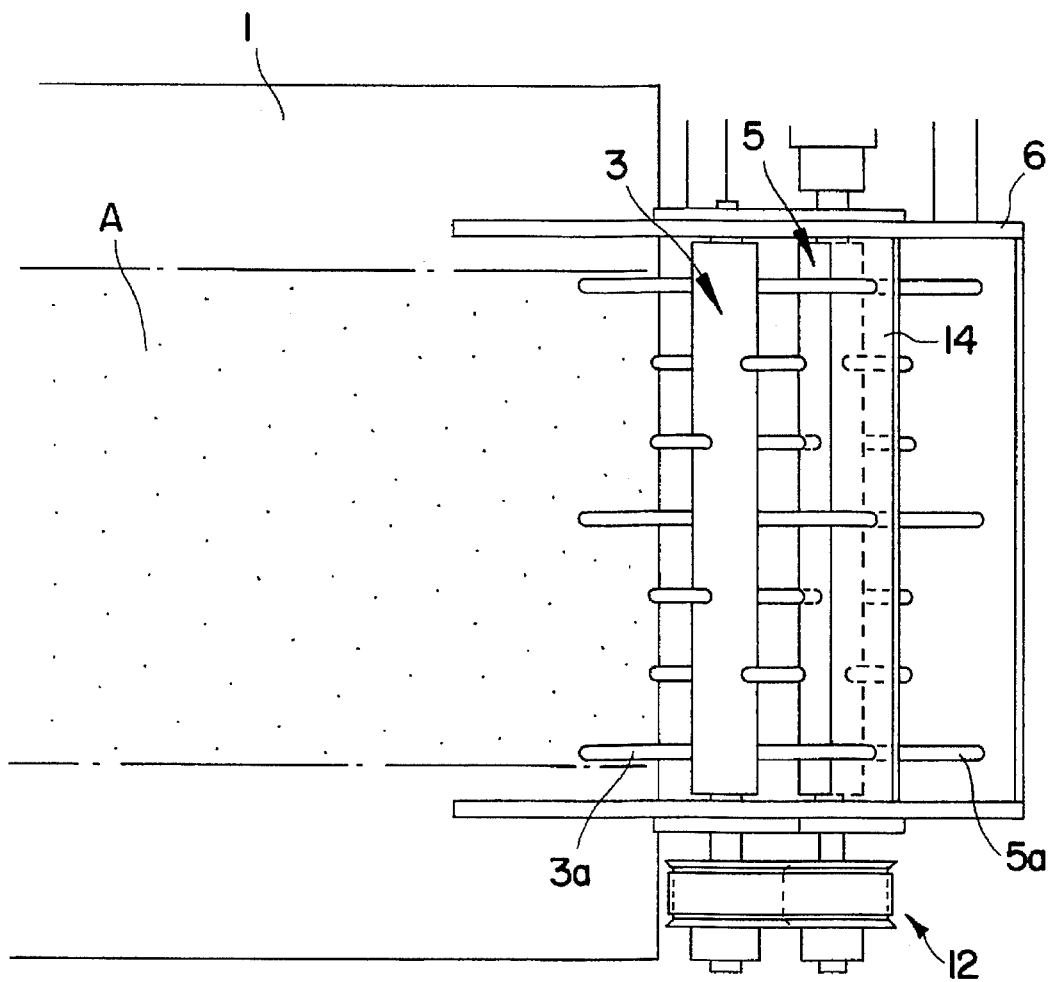
FIG. 2 is a plan view of FIG. 1.

A constant-rate feeding device 25 differs from the device of FIG. 2 in that the damper 4 comprises a plurality of divided members 4c and that the second vane wheel 5 is not provided.

The damper 4 has five pairs of divided members 4c (for a total of ten). Five cylinders 9 are provided to push and pull the respective pairs of divided members 4c to control the amount of powdery material that passes therethrough. Namely, by pulling the cylinders one by one, or two to five cylinders at a time, it is possible to properly adjust the area of the opening of the damper 4 so that the powdery material can be fed little by little at a controlled rate.

The total number of divided members 4c and the number of divided members coupled to one cylinder are not limited.

Their shape is also not limited. For example, they may be pin-shaped or plate-shaped.

Figure 12:
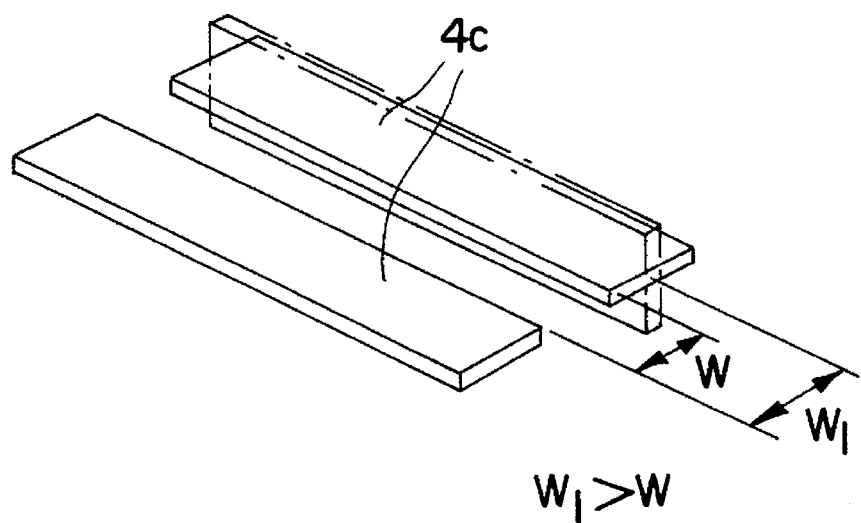
FIG. 12 is a perspective view of a modification of divided members.
Figure 13A:
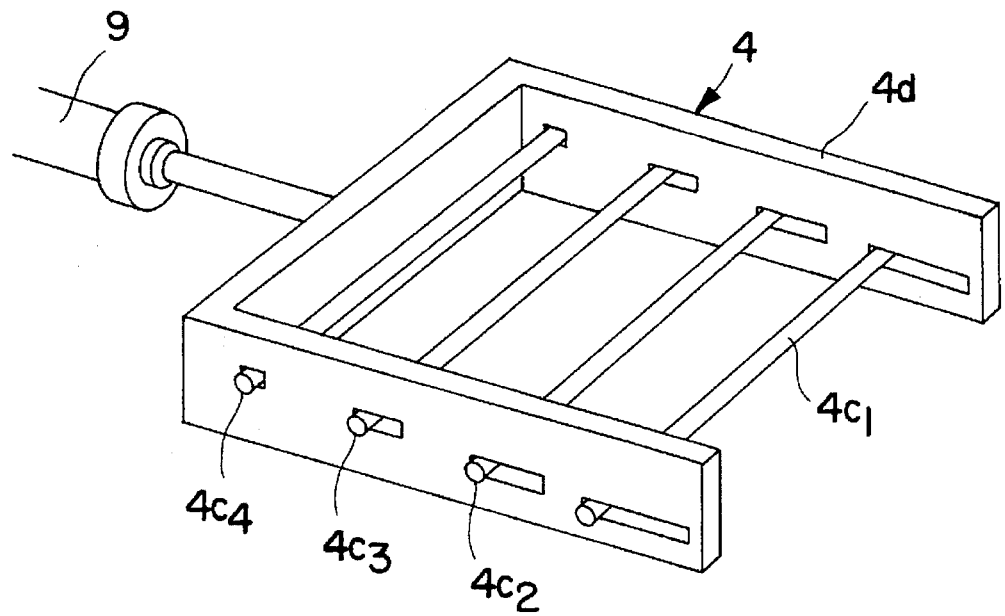
FIG. 13(a) is a perspective view of another example the a damper.

In the embodiment of FIG. 12, the area of the opening of the damper is controlled by adjusting the width W of the openings with rotating plate-shaped members by a suitable drive means (not shown). In the embodiment of FIGS. 13, the area is controlled by moving the respective divided members 4c by different distances by pushing or pulling a cylinder 9 and an adjusting plate 4d coupled to the cylinder and carrying the divided members 4c.

Figure 13B:
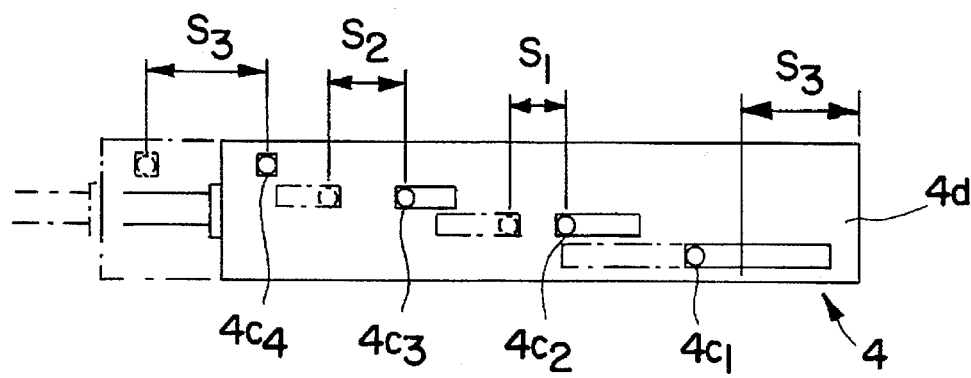
FIG. 13(b) is a side view of the damper of FIG. 13(a)
Figure 14:
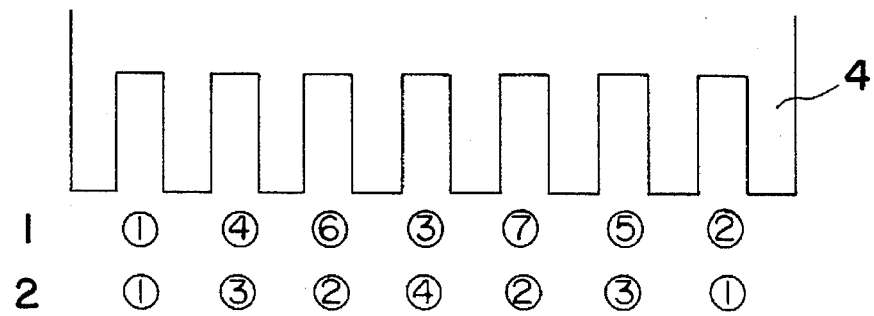
FIG. 14 is a view showing the order of passage of vanes of a vane wheel through openings.

The damper of FIG. 13 has four divided members 4c1–4c4 carried by the adjusting plate 4d. The divided members are mounted in holes formed in the plate 4d which have different lengths from one another in the direction in which the plate 4d is moved. Thus, if the plate 4d is moved by a distance S3 from the position shown in FIG. 13(b) by solid line, the divided member 4c4 is moved from the original position by the same distance, i.e. S3, while the members 4c3 and 4c2 are moved by distances S2 and S1, respectively. The member 4c1 does not move at all. Thus, the gap between the members 4c1 and 4c2, the gap between the members 4c2 and 4c3, and the gap between the members 4c3 and 4c4 increase by S1, S2 minus S1 and S3 minus S2, respectively. By adjusting the gap widths between the adjacent members 4c as described above, it is possible to control the flow rate of the powdery material.

In this embodiment, too, the secondary feed rate control by the damper 4 is carried out only during the final stage of the material feed cycle. Until then, the comb teeth are located out of the feed path by retracting or rotating them. With this arrangement, since the area of the opening of the damper is kept at a maximum for a greater part of the time, the weighing speed increases.

Figure 15:
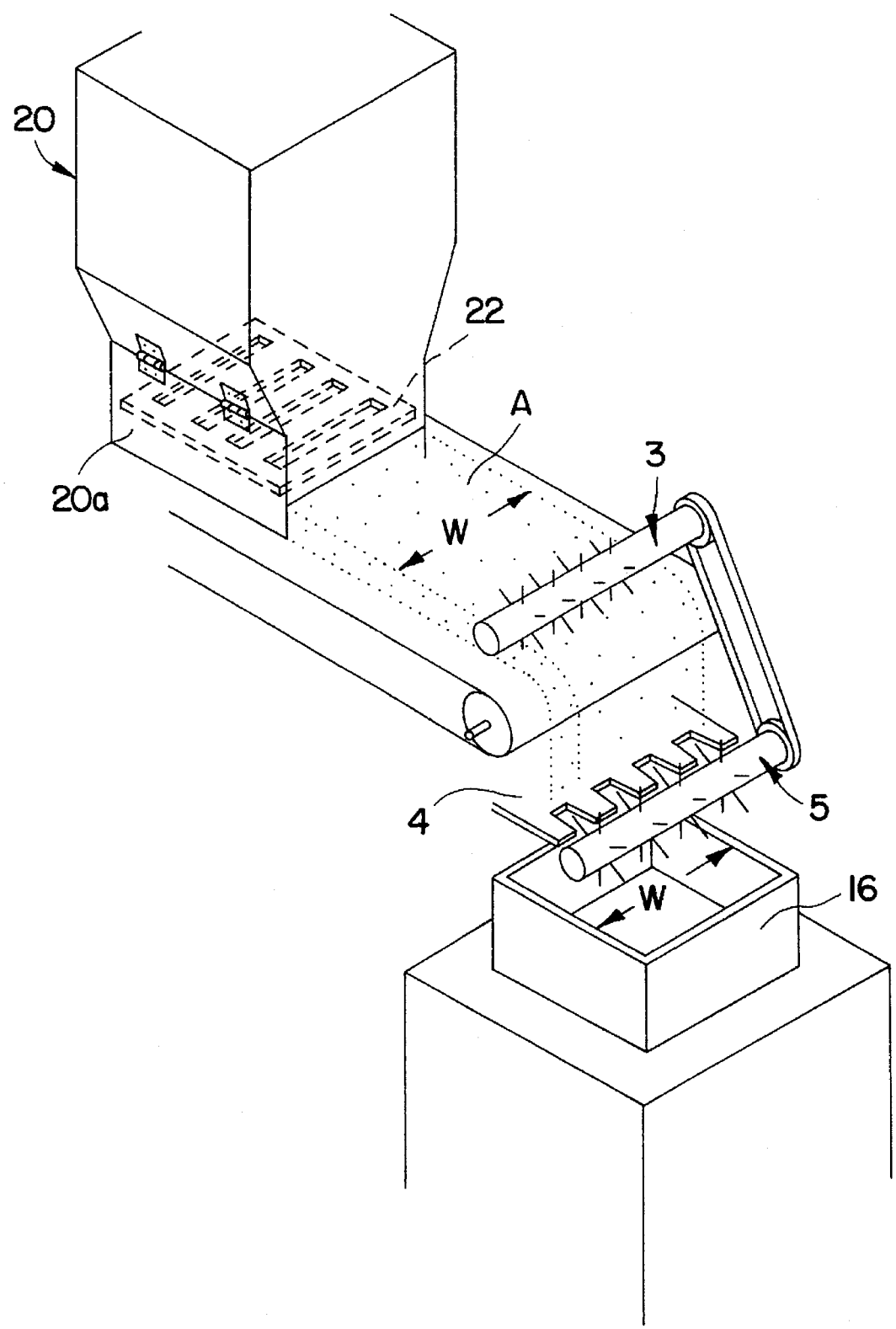
FIG. 15 is a schematic perspective view of the device shown in FIG. 1 having a hopper added thereto.

FIG. 15 shows a method of manufacturing a compacted product of powdery material using the feed device shown in FIG. 1.

As shown in the figure, over the belt feeder 1 is provided a hopper 20 for feeding a powdery material A onto the conveyor belt of the feeder 1. The hopper 20 carries a control unit 21 for adjusting the width of the outlet, which is to be described below, and a shutter 22 for controlling the thickness of the powdery material being fed.

The shutter 22 is similar to the damper 4 used in the feed device. Namely, it has openings defined between divided members. The opening area of the hopper outlet and thus the amount of material that drops from the hopper per unit time are controlled by adjusting the widths of the gaps between the teeth or by adjusting the length of the portions of the teeth that are inserted into the hopper. The shutter 22 also controls the thickness of the material being fed on the conveyor belt.

Figure 16A:
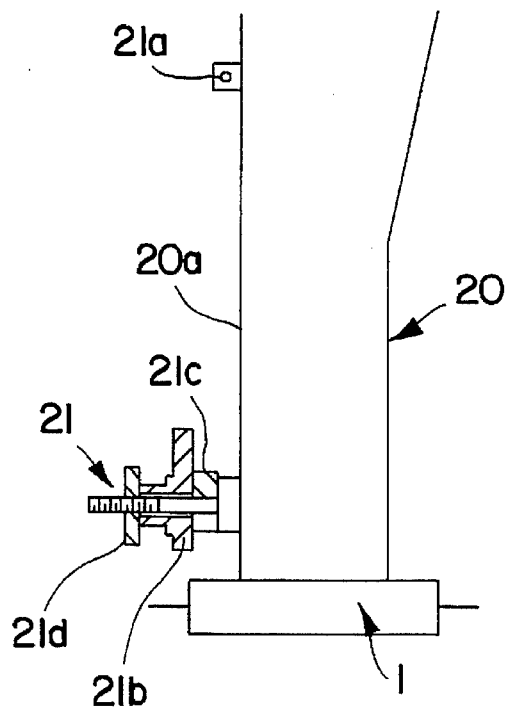
FIGS. 16(a–c) are views showing a control means for controlling the width of a hopper outlet.
Figure 16B:
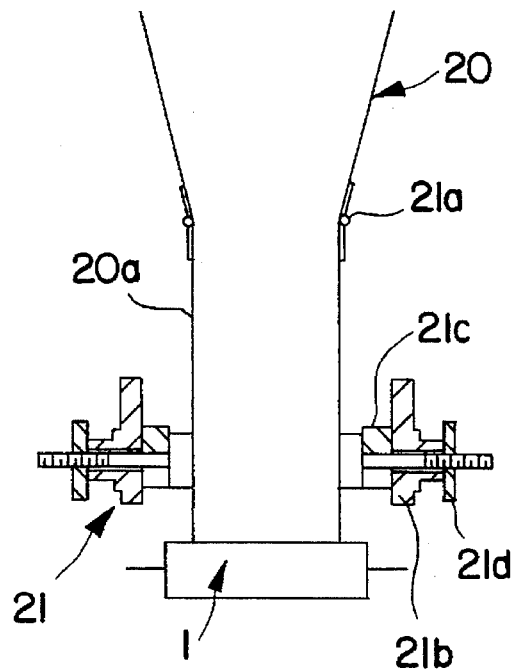
Figure 16C:
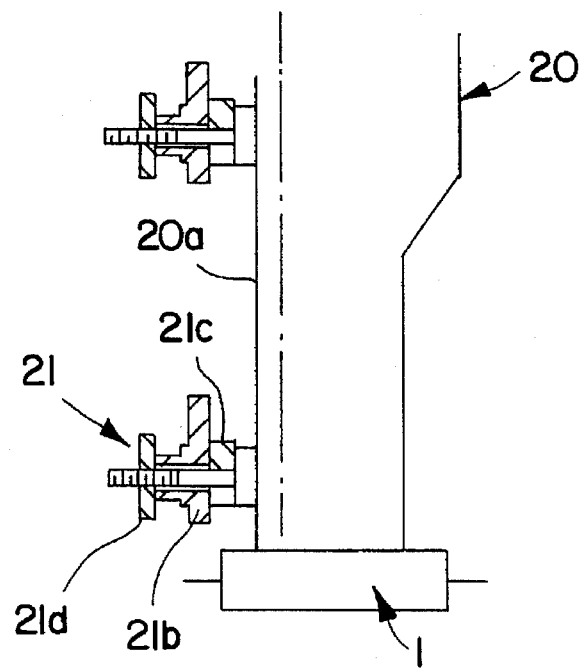

The control unit 21 for adjusting the hopper outlet width has, as shown in FIG. 16(a), a shaft 21a about which a side plate 20a at the hopper outlet is pivotable. Its pivot amount is determined by inserting a collar 21c having a suitable thickness in a gap between the side plate 20a and a fixed member 21b. After inserting the collar 21c, a lock nut 21d is tightened on a bolt fixed to the side plate 20a to lock the side plate in position. The collar 21c is selected from among a plurality of collars having different thicknesses. As shown in FIG. 16(b), both side plates 20a of the hopper may be pivotably mounted so that both of them are pivotable toward and away from each other. Otherwise, as shown in FIG. 16(c), one or both of the plates 20a may be mounted so as to be slidable while kept parallel to the other plate or to each other. In any case, by adjusting the position(s) of the side plate(s), it is possible to change the width of the material being fed onto the conveyor belt.

Figure 17A:
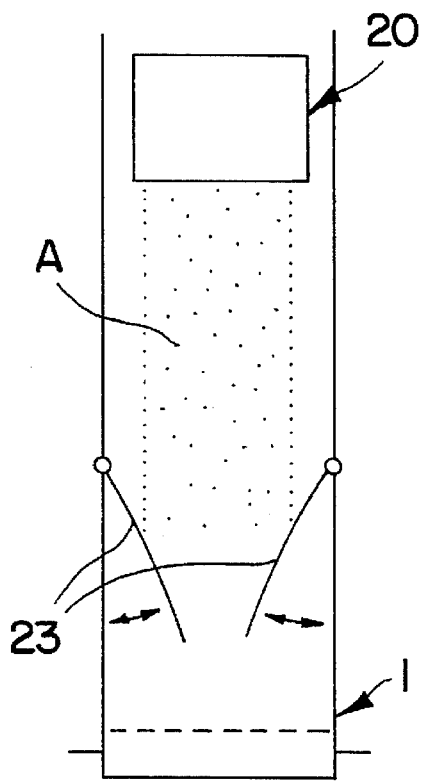
FIGS. 17(a and b) are diagrams of guide plates for controlling the width of feed of the material.
Figure 17B:
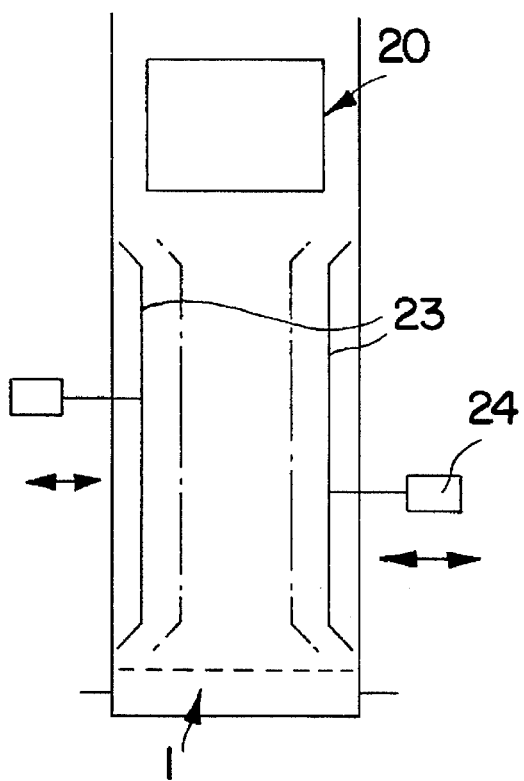

As shown in FIGS. 17(a), 17(b), the width of the material being fed on the conveyor belt may be controlled by adjusting the distance between guide plates 23 provided over the conveyor belt. The guide plates 23 may be mounted so as to be pivotable about one end thereof as shown in FIG. 17(a) or so as to be movable while staying parallel to each other by cylinders 24 as shown in FIG. 17(b).

Now we will describe the embodiments in more detail.

Figure 18:
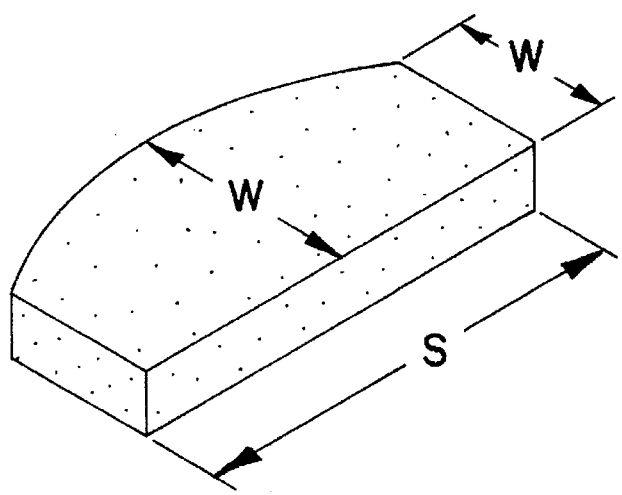
FIG. 18 is a perspective view of a sample pad.
Figure 19:
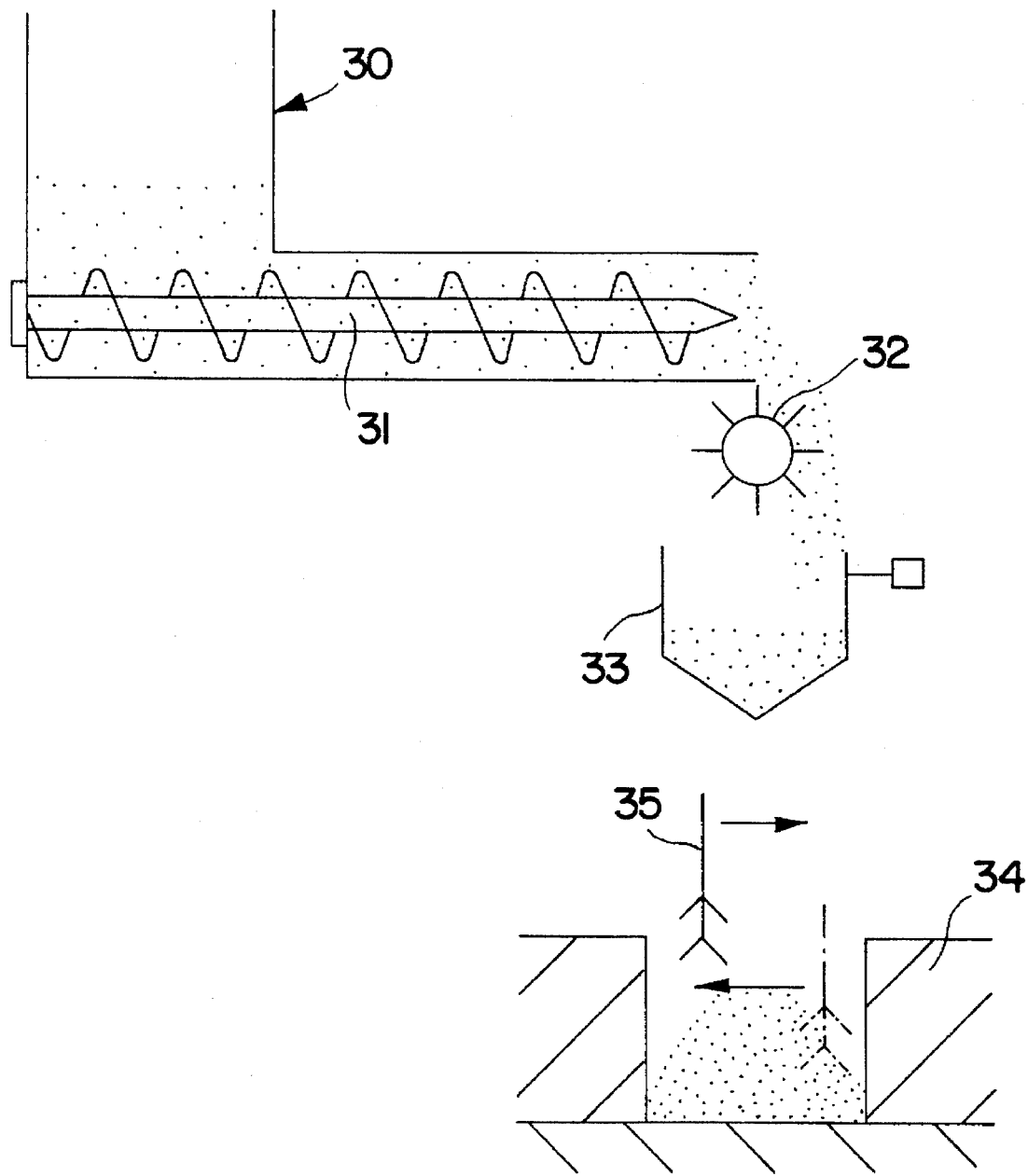
FIG. 19 is a schematic diagram showing a method of manufacturing a compacted powder product using a screw feeder.

A powdery material was fed and weighed using the constant-rate feeding device according to the present invention and a uniaxial screw feeder having a diameter of 50 mm so as to manufacture semimetallic pads having a shape as shown in FIG. 18. Table 1 shows the weights and measurements of the pads I, II and III thus made. The constant-rate feeding device of the present invention was set so that the material will be fed on the belt feeder toward the weighing unit in a 13-mm-thick, 100-mm-wide layer.

A mold of the same size and shape as the pad was placed on a weighing scale and the mixed material was dropped into the cavity of the mold until the material in the mold reaches a predetermined weight. As described above, the material was initially fed at high speed and the feed rate was lowered at the final stage for fine adjustment of the feed rate. The material fed by the screw feeder heaped like a mound in the cavity. Thus, in order to flatten it out, a 15-mm-wide knife was reciprocated three times through the mound of material. The material fed by the device of the present invention was not flattened with a knife. But as for the pad I, a 100-mm-wide material was dropped into an 80-mm-wide cavity through a chute having a tapered outlet opening.

Thereafter, the material in the cavity was hot-pressed under a pressure of 200 kg/cm$^2$ for 10 minutes at 150° C. Then, it was left at 170° C. for 10 hours to allow it to harden completely.

Disk pads having no back plates were thus formed. They were cut to obtain 10-mm-wide specimens for the central and left-end portions. The porosity of these specimens was measured by the JASO C444-78 standards.

Also, the pads were subjected to an 80-cycle endurance test, each cycle consisting of immersing the pad in 5% salt water for one hour, drying them for two hours at 50° C. and heating them for five hours at 200° C. After the test, the pads were evaluated for the degree of degradation.

The pads were made of a mixture of 65% (in weight %) steel fiber, 20% graphite, 7% phenolic resin, 6% BaSo$_4$, 1% ZrO$_2$ and 1% powdered rubber.

Table 2 shows the test results.

The test results show that the pads in the Comparative Examples are practically useless as disk pads for cars used in cold areas where salt water is sprayed on roads to melt snow.

Another property required for friction members is high wear resistance. It is known that the higher the porosity, the lower the wear resistance. In this respect, the Comparative Examples are very high in porosity at the end portions. Thus, such pads tend to be worn unevenly, particularly at the disk-incoming end. Unevenly worn pads hamper stable brake control.

It was also confirmed by experiments that the best results are achievable when the material is fed on the belt feeder at a width equal to the width of the end products.

As described above, with the constant-rate feeding device according to this invention, the powdery material is divided into small masses by the first vane wheel. The divided masses are further divided into still smaller masses by a damper having a plurality of openings and the second vane wheel or by the damper having movable divided members for adjuring the area of the opening of the damper. Thus, even a powdery material having a high entangling tendency can be weighed out with high accuracy. By providing the shutter under the damper, it is possible to improve the weighing accuracy still further.

The secondary feed rate control by the damper is carried out only at the final stage of the feed operation. Until then, the damper is located out of the feed path of the powdery material, or the damper opening is kept wide open so that the feeder can be driven at high speed. Thus, even a powdery material having a large entangling tendency can be weighed out at high speed, so that it is possible to improve both the quality of the end products and its mass-productivity.

The method according to the present invention is carried out using the above-mentioned constant-rate feeding device. Since the material is fed while controlling its width and thickness and then press-molded, the material never separates, segregates nor splashes and its components are mixed uniformly, so that homogeneous end products can be reliably produced.

TABLE 1

| Pad | Dimension (mm) | | | Weight |
| --- | --- | --- | --- | --- |
| | ω | W | S | (g) |
| I | 35 | 50 | 80 | 110 |
| II | 40 | 55 | 100 | 160 |
| III | 45 | 60 | 130 | 210 |

TABLE 2

| | Comparative example | | | Example | | |
| --- | --- | --- | --- | --- | --- | --- |
| Pad | I | II | III | I | II | III |
| Porosity | | | | | | |
| End portion | 19 | 23 | 29 | 6.5 | 9 | 12 |
| Central portion | 6 | 5.5 | 4 | 11 | 7 | 6.5 |
| Deterioration with salt water | In every example, its outer periphery bulged with dark red rust. Especially II and III became fragile. | | | In every example, red rust of 1 mm thick developed on its outer periphery. But its interior was normal. | | |

We claim:

1. A constant-rate feeding device for feeding a powdery material containing a material having a tendency to become entangled, comprising:
   a feeder for feeding the powdery material at a controlled feed rate to an outlet thereof;
   a weighing unit located below said outlet of said feeder;
   a feed path of powdery material extending from said outlet to said weighing unit;
   a damper located in said feed path, said damper having a plurality of teeth in comb form, said plurality of teeth having openings defined there between, and said damper receiving the powdery material from said feeder;
   a discharging member for discharging powdery material deposited on said damper through said openings by periodically passing through said openings; and
   a means for moving said damper out of said feed path of powdery material and maintaining said damper out of said feed path until the amount of powdery material in said weighing unit approaches a predetermined value.

2. A constant-rate feeding device as claimed in claim 1, and further comprising a vane wheel for dividing the powdery material fed from said feeder into a plurality of masses.

3. A constant-rate feeding device as claimed in claim 1, and further comprising a shutter provided between said damper and said weighing unit for receiving the material discharged through the openings of said damper.

4. A constant-rate feeding device for feeding a powdery material containing a material having a tendency to become entangled, comprising:
   a feeder for feeding the powdery material at a controlled feed rate to an outlet thereof;
   a weighing unit located below said outlet of said feeder;
   a damper located between said feeder and said weighing unit, said damper comprising a plurality of separate members that are separately movable for receiving the powdery material from said feeder, said plurality of separate members defining openings therebetween;
   a means for independently moving said plurality of separate members relative to one another so as to change the areas of said openings.

5. A constant-rate feeding device as claimed in claim 4, and further comprising a vane wheel for dividing the powdery material fed from said feeder into a plurality of masses.

6. A constant-rate feeding device as claimed in claim 4, and further comprising a shutter provided between said damper and said weighing unit for receiving the material discharged through the openings of said damper.

7. The device of claim 4, wherein said separate members comprise elongate plate members that are divided and parallel to one another and longitudinally separately movable.

8. The device of claim 4, wherein said separate members comprise elongate plate members that are parallel to one another and rotatable about respective longitudinal axes thereof.

9. The device of claim 4, and further comprising means for moving said damper from between said outlet and said weighing unit and maintaining said damper away from between said outlet and said weighing unit the amount of powdery material in said weighing unit approaches a predetermined value.

10. A constant-rate feeding device as claimed in claim 9, and further comprising a shutter provided between said damper and said weighing unit for receiving material discharged through said openings of said damper.

11. A constant-rate feeding device for feeding a powdery material containing a material having a tendency to become entangled, comprising:
   a feeder for feeding the powdery material at a controlled feed rate to an outlet thereof;
   a weighing unit located below said outlet of said feeder;
   a damper located between said feeder and said weighing unit, said damper comprising a plurality of members that are separately movable for receiving the powdery material from said feeder, said plurality of members defining openings; and
   a means for moving said plurality of members relative to one another so as to change the areas of said openings;
   wherein said damper comprises a frame having side walls and a plurality of pairs of elongate holes in respective said side walls, wherein each of said pairs of elongate holes has a different length in a longitudinal direction of said frame, wherein said members extend parallel to each other in a lateral direction and have opposite ends received in respective elongate holes of one of said pairs of elongate holes, and wherein said frame is movable in a direction perpendicular to the lateral direction.

12. A method of manufacturing a compacted powdery product, comprising the steps of:

dropping a powdery material by gravity onto a belt feeder from a box-shaped hopper located over the belt feeder, the box-shaped hopper controlling the feed of the powdery material on to the belt feeder such that the powdery material on the belt feeder has a uniform thickness by opening and closing a shutter at a bottom of said hopper, the shutter having a plurality of teeth in comb form;

feeding the powdery material on the belt feeder toward a weighing unit while controlling the width of the material on the belt feeder to a range of ½ to 3/2 of the width of a desired compacted powdery product;

feeding the material from the belt feeder to the weighing unit at a constant rate with a feeding device comprising a damper located in between the belt feeder and the weighing device, the damper having a plurality of spaced members defining openings, and one of the damper and the plurality of spaced members of the damper being movable so as to change a total open area between the weighing unit and the belt feeder;

weighing the material fed from the belt feeder at the weighing unit in a weighing can thereof and stopping the feed of material when a predetermined amount of the powdery material has accumulated; and press molding the powdery material to form the desired compacted powdery product.

13. The method of manufacturing a compacted powdery product as claimed in claim 12, wherein the material is press-molded after emptying the material in the weighing can into a mold.

14. The method of manufacturing a compacted powdery product as claimed in claim 12, wherein the box-shaped hopper comprises a control device controlling the width of an outlet opening of the hopper, thereby controlling the width of the material being fed on the belt feeder.

15. A method of manufacturing a compacted powdery product as claimed in claim 12, wherein a pair of guide plates are provided on a conveyor belt of the belt feeder, the pair of guide plates being movable toward and away from each other, and wherein the width of the material being fed on the belt feeder is controlled by adjusting the spacing between the guide plates.

16. A method of manufacturing a compacted powdery product as claimed in claim 13 wherein a pair of guide plates are provided on a conveyor belt of the belt feeder, the pair of guide plates being movable toward and away from each other, and wherein the width of the material being fed on the belt feeder is controlled by adjusting the spacing between the guide plates.

* * * * *